United States Patent [19]

Alts

[11] Patent Number: 5,186,996
[45] Date of Patent: Feb. 16, 1993

[54] SOUND DAMPING MULTI-LAYER STRUCTURE

[75] Inventor: Thorsten Alts, Gross-Bieberau, Fed. Rep. of Germany

[73] Assignee: Matec Holding AG, Switzerland

[21] Appl. No.: 743,372

[22] PCT Filed: Dec. 21, 1990

[86] PCT No.: PCT/CH90/00291

§ 371 Date: Aug. 26, 1991

§ 102(e) Date: Aug. 26, 1991

[87] PCT Pub. No.: WO91/09728

PCT Pub. Date: Jul. 11, 1991

[30] Foreign Application Priority Data

Dec. 29, 1989 [CH] Switzerland ............... 4683/89

[51] Int. Cl.$^5$ .................................... B32B 3/00
[52] U.S. Cl. ............................... 428/72; 428/73; 428/118; 428/116; 428/117; 428/308.4; 428/317.9; 181/284; 181/288; 181/294; 181/290
[58] Field of Search ............ 428/72, 73, 118, 117, 428/116; 181/284

[56] References Cited

U.S. PATENT DOCUMENTS

| 4,317,503 | 3/1982 | Söderquist et al. ............ 428/118 |
| 4,374,172 | 2/1983 | Schwarz et al. ............... 181/288 |

FOREIGN PATENT DOCUMENTS

| 0255332 | 2/1988 | European Pat. Off. |
| 8201511 | 9/1982 | Fed. Rep. of Germany |
| 2408889 | 7/1979 | France ........................ 181/288 |

*Primary Examiner*—Patrick J. Ryan
*Assistant Examiner*—Abraham Bahta
*Attorney, Agent, or Firm*—Wigman & Cohen

[57] ABSTRACT

A sound-absorbing multi-layer structure is disclosed comprising a structural part which is capable of oscillating and a loosely engaging damping sheet, which sheet comprises a flexible material and high material absorption factor and is made up of a heavy sheet with a viscoelastic support layer tightly connected thereto. The support layer comprises a plurality of angularly constructed support elements which are shaped and arranged so that together with the structure which can oscillate and the flexible heavy sheet they form a coherent labyrinth of hollow spaces with acoustically effective cavities.

21 Claims, 1 Drawing Sheet

SOUND DAMPING MULTI-LAYER STRUCTURE

BACKGROUND OF THE INVENTION

1. Field of the Invention

The present invention relates to a sound-absorbing multi-layer structure for noise reduction, having at least one structural part which is capable of oscillating, preferably of sheet metal or plastic, and an oscillation-absorbing sheet, as well as an especially suitable type of oscillation-absorbing damping sheet for use in this multi-layer structure.

Such sound-absorbing multi-layer structures are found essentially in automobiles, wherein floors, dashboards, doors, roofs and so forth are covered in order to reduce the noise level produced in each of these auto body parts. Measures for the reduction of sound conveyance are particularly important since the negative influences arising from noise are now recognized as leading to passenger discomfort, such as headaches, pounding heartbeat or high blood pressure. Today's automobile industry thus strives to reduce the vehicular noise level as much as possible.

2. Description of the Prior Art

Known measures for reducing of the noise level produced by vibrating automobile body parts are limited to reinforcing and damping the auto body parts in question and to apply additional sound insulation. The known sound-absorbing multi-layer structures consist essentially of a body part and a flex-resistant, dissipative sheet, adhering thereto by means of an adhesive, by being fused thereon. Traditional sound-insulating layers, such as a decorative or a carpet layer, are overlayered. The flex-resistant damping sheets which are used are known to those skilled in the art under various trade names, for instance, Bitumenfolie X999/UKN.

These conventional flex-resistant damping sheets include various properties which are disadvantageous when the damping sheet is in use. On the one hand, application of the differently trimmed and shaped insulation sheets requires both considerable space along the manufacturing assembly line and also costly logistics. On the other hand, during trimming and with the processing, these damping sheets are inclined to peel or break off in bits, forming crumbly lumps. These lumps contaminate the immersion baths used in the finishing of the vehicles, especially paint baths, in an intolerable manner and cause additional cleaning measures to be required, which increase the manufacturing cost.

Another considerable drawback of these flex-resistant damping sheets also lies in the temperature-dependency of their material properties.

OBJECTS AND SUMMARY OF THE INVENTION

A principal object of the present invention is therefore to provide a sound-absorbing multi-layer structure which does not incorporate the technical drawbacks of the known multi-layer structures.

The sound-absorbing multi-layer structure, according to the invention provides improved sound-absorbing effectiveness compared with the conventional multi-layer structures, allowing for a cost-favorable assembly without contamination of the immersion baths used for finishing the vehicles. The present inventive sound absorbing structure permits long use, exhibits no unusual fatigue or appearances of wear, and retains its sound-absorbing effectiveness without modification.

The recycling requirements of the industry management are thus fulfilled. It is especially significant that the present multi-layer structure can be disassembled quite simply.

This object is attained according to the invention with a sound absorbing multi-layer structure of the aforementioned type which is characterized in that the oscillation-absorbing sheet comprises one or more flexible heavy sheets and one viscoelastic support layer connected tightly therewith, which support layer incorporates a plurality of angularly structured support elements, the damping sheet engages with its support layer on the structure which has the capacity to oscillate,
and the individual support elements are shaped and arranged so that together with the structure which is capable of oscillating and the flexible heavy sheet they form a coherent labyrinth of hollow spaces with acoustically effective cavities.

It has been indicated that the multi-layer structure according to the invention has notably improved insulating effectiveness as compared with known sound-absorbing multi-layer structures, especially in the frequency ranges which have a disturbing effect in automobile bodies. The acoustic properties of the sound-absorbing multi-layer structure can thus be considerably improved without further increasing either the thickness of the sheet or the surface weight of the multi-layer structure.

One great advantage of the multi-layer structure according to the invention lies in its manufacture in the course of automobile construction. Since the sound-absorbing sheet is not adhered or fused on in the case of the present multi-layer structure, this structure can be inserted into the vehicle after the vehicle body has been immersed in the immersion bath and dried in the furnace. This avoids the situation wherein crumbly lumps from the sheet contaminate the immersion bath. In a special case the sheet can also be integrated into the sound-insulating original structure, thus deleting the work step of insertion of the sheet.

Another remarkable advantage of the multi-layer structure according to the invention resides in the use of a flexible heavy sheet which incorporates the desired acoustic effects in a considerably wider temperature range than the conventional nonflexible bitumen foils. Also, as a result of the possible later application of the heavy sheet, the possibility of temperature coupling arising between the body part and the heavy sheet is lowered, which improves the effectiveness of the multi-layer structure even in the case of extreme temperatures.

The improved effectiveness of the multi-layer structure according to the invention is surprising to the person skilled in the art insofar as on the one hand the material absorption factor of a flexible heavy sheet is lower than in the case of rigid materials and on the other hand, with insertion of the bare sheet, the multi-layer structure exhibits no noticeable rigidification as compared with multi-layer structures applied with adhesive or fused onto the sheet.

The improved acoustic absorption effectiveness generally resides in the behavior of the limit layer between damping sheet and oscillating automobile body part. On the one hand the outside friction acts on this limit layer (as a result of conversion of oscillation energy into heat)

for effectively higher energy losses than in the case of the traditional adhering or fused-on multi-layer structures, and on the other hand the sheet and the automobile body part can oscillate freely counter to one another at least in certain areas and can thereby facilitate a mechanical pulse interchange with exceptionally effective damping effect.

Essential for the improvement of the absorption mechanism is the angularly structured support layer, which, because of the construction of the easily deformable support elements corresponds to the material absorption of the sheet obtained by very large deformations in these elements in an improved manner. Moreover, because of the special arrangement of these support elements a coherent labyrinth of hollow species forms with acoustically active cavities, which drastically increase the friction and reflection absorption of the air which is oscillating back and forth.

In one improved embodiment these support elements are of a star-shaped profile and are arranged so that triangular cavities are formed.

In another embodiment the support elements are shaped and arranged in such a manner that circular cavities are formed.

Other improved embodiments and features of the multi-layer structure according to the invention are disclosed in the following description and claims.

BRIEF DESCRIPTION OF THE DRAWINGS

The invention will now be described in greater detail relative to one exemplary embodiment with the aid of the drawings, wherein.

DETAILED DESCRIPTION OF A PREFERRED EMBODIMENT

Figure 1:
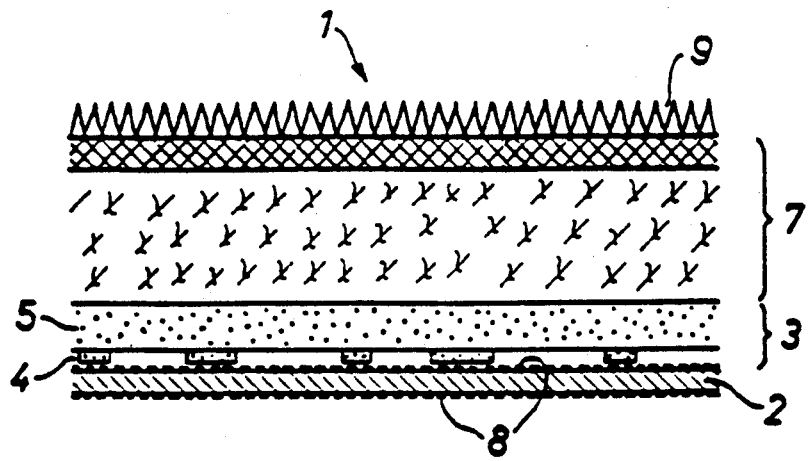
FIG. 1 is a transverse section through a multi-layer structure according to the present invention.

Referring to FIG. 1, the multi-layer structure 1 shown includes a structural part 2 which can oscillate, on which is mounted the oscillation-absorbing sheet 3. Structural part 2 may be made of sheet metal or plastic. Sheets may be formed of any heavy layered material which is traditionally used in the vehicle manufacture industry. Any number of such products are known to persons in this art. In one tested embodiment of the multi-layer structure according to the invention an EPDM foil is used as a damping sheet. These damping sheets are traditionally of a thickness of 3 to 6 mm.

Damping sheet 3 used in the present multi-layer structure consists of a flexible heavy sheet 5 and a support layer 4 tightly connected therewith. A damping sheet is intended to be a flexible heavy sheet of which the flexural stiffness at room temperature is considerably lower than that of a bituminous sheet with high E module, especially at room temperature (approximately 23° C.) where the static bending resistance per unit of surface and per unit of bending angle is approximately a factor of −6 smaller than in the case of the conventionally used flexural resistant sheet.

The support layer 4 connected tightly with flexible heavy layer 5 is composed of a plurality of support elements 6. These support elements 6 could be made of any material which has both a high sliding friction coefficient and a high absorption factor, in order to procure a satisfactory acoustical effectiveness by direct friction absorption and by viscoelastic deformation absorption. These support elements 6 can be directly adhered to or be fastened with the aid of a support sheet to the heavy sheet or can be impressed directly thereon by being stamped into the heavy sheet. In one tested embodiment a 6 mm-thick flexible heavy sheet was stamped so that these support elements 6 remained standing as unimpressed partial areas of a thickness of 1 to 2 mm.

In another construction of the multi-layer structure according to the invention a sound-insulating layer 7 is applied to the heavy sheet 5. Such sound-insulation layers 7 are known to the expert in the art and for example could have a sandwich structure functioning as a mass-spring-system. These sound-insulating layers are generally approximately 20 mm thick.

A decorative or carpet layer lies over sound-insulating layer 7, as is customary in the automobile industry.

For special uses, such as for instance as floor covering (carpet tiling, PVC or other similar coverings) in the area of the floor with high local wear, the sound-insulating layer can consist of hard foam material or compressed textile or mineral fleece or else can be deleted entirely.

Such a multi-layer structure simultaneously absorbs both the oscillation components which arise perpendicular to the structure, indicated hereinafter as standard components, and also the oscillation components arising parallel to the structure, hereinafter indicated as transverse components. The standard components being carried directly from structure 2 onto sheet 3 cause inner deformations and bending oscillations or flexural vibrations of the sheet, of which the high absorption factor contributes remarkably to the damping effect. Because damping sheet 3 engages only loosely on structure 2, it will be made possible for the sheet under certain conditions to partially lift from structure 2 and upon dropping back down, to effectively damp structure 2 with a pulsed thrust in the opposite direction.

Another sound-absorbing mechanism is indicated in the case of vibrations in transverse direction and exists mainly in shear deformations with bending oscillations or flexural vibrations. These vibrations deform the individual rod-shaped support elements 6, and movement energy is converted once again into deformation energy. Thus, it is essential that the individual support elements 6 be of angular construction, in order to obtain heightened viscoelastic absorptions in the areas of the individual edges of the elements.

A remarkable damping effect however is caused by the outside friction between support layer 4 and structure 2, which friction converts the oscillation energy directly into friction heat and thereby decreases the level of need for the oscillating system.

Use of the multi-layer structure according to the present invention means that the dissipative mechanism in the limit layer and support layer requires increased vigilance. Especially important is the fact that a large portion of the oscillation energy of the air oscillating between structure 2 and flexible heavy sheet 5 is also cancelled. Support elements 6 are shaped and arranged in a special manner for that purpose. It is of particular note that support elements 6 together with structure 2 and heavy sheet 5 form a labyrinth of hollow spaces, which allows the oscillating air to be moved in transverse direction over all of the oscillating surfaces. Thus the oscillating air especially loses sound energy in an ever-increasing measure through friction and reflection absorption. Remarkable for the present invention are the cavities 12 formed by the special embodiment and special arrangement of the support elements 6. These open cavities are of such dimensions that the sound frequencies in the case of automobile structure are reabsorbed optimally. The sound-absorbing effects of these hollow spaces have been proven to be surprisingly high.

Figure 2:
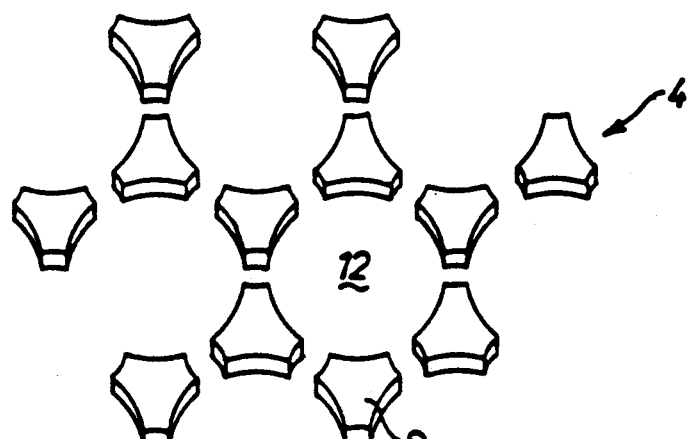
FIG. 2 is a special arrangement and configuration of support elements in the support layer of the multi-layer structure according to the present invention.
Figure 3:
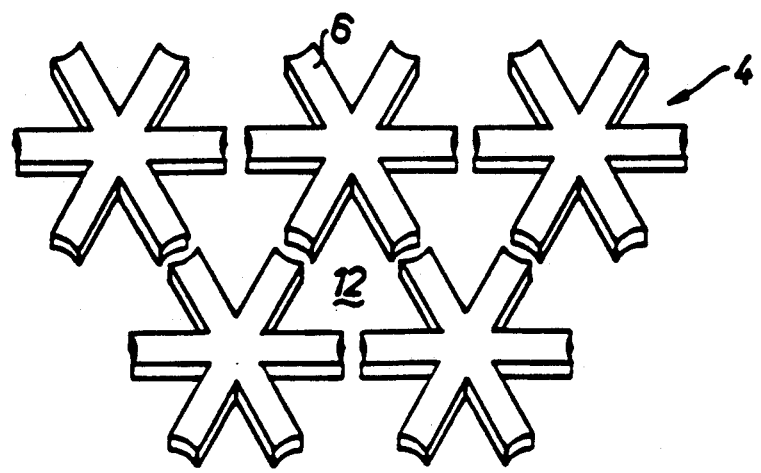
FIG. 3 is one of the preferred arrangements and configurations of support elements in the support layer of the multi-layer structure according to the present invention.

FIGS. 2 and 3 show embodiments and arrangements of tested support elements 6 which in their entirety form the support layer 4. In the tested embodiments, acoustically effective cavities 12 may demonstrate a base surface of approximately 1 or respectively 5 cm$^2$ and have a height of approximately 1 mm. Thus, it is important for the reasons explained earlier that the individual cavities 12 be connected together directly and/or indirectly. These connection openings in the configuration shown in FIG. 2 and having circular base surface demonstrate a small width of approximately 3 mm and a length of 5 mm.

In the case of the configuration of support elements shown in FIG. 3 it is shown that with normal temperature of 23° C. and a characteristic standard frequency for the structure of the automobile floor sheet of approximately 130 Hz, the damping constant for the fading away of the plate oscillation was improved up to a factor of 2 in comparison with a comparable unstructured bitumenous sheet. The lengths of the sides of these triangular cavities was 2 cm in these particular embodiments, while the width of the individual rods of these star-shaped support elements 6 was approximately 5 mm.

It is to be understood that other dimensions and/or other configurations of the present support elements 4 can be undertaken by the skilled artisan without inventive new thought in order to be able to optimally adapt the multi-layer structure to its relevant use. Especially conceivable for the expert in the art are other support layers 4 wherein support elements 6 can be of different materials and especially can be of different thicknesses. Measures intended to increase the friction coefficients between support layer 4 and structure 2 also lie within the general technical know-how of those skilled in the art.

The aforementioned sound-absorbing multi-layer structure can be used in motor vehicles of any type, and also in construction or industrial machinery, of which the sound levels can be intolerable.

However, the sound-absorbing multi-layer structure can also be used in the construction arts as sound-absorbing floor covering. Under special conditions regarding the local carrying capacity, the leaf-spring layer can be entirely deleted or be replaced by a hard foam or compressed textile or mineral fleece. An improved impact sound insulation is thereby attained and by partial detachment of the building roof, a lessening of sound transmission into adjacent or underlying spaces.

Finally the damping sheets 3 of the sound-absorbing multi-layer structure 1 are construed as effective oscillation dampers for high surface pressures. For that purpose the rods of support layer 4 and heavy sheet 5 must be manufactured of filled elastomers (rubber), and to increase the specific carrying capacity of the surface, heavy sheet 5 must be reinforced with long fibers (steel, Kevlar®, glass, carbon fibers, etc.), in one-layer or multi-layer configuration, to provide reinforcement in rectangular or oblique-angled cross-bracing. Reinforcement obtained by short fibers in static direction distribution in the plane of the heavy sheet likewise increases the surface-specific carrying capacity. Such fiber-reinforced open rod structures as in FIGS. 2 and 3 provide stress deformations for the thickness and shear deformations, in other words rod deformations, in the planes of stratification. In other words bending deformations on the contrary are possible only in the case of considerable bending moment. These fiber-reinforced heavy sheets or damping layers with open rod structures on one or both outside surfaces incorporate a remarkably improved damping ratio in the case of impact and heavy oscillations over layers of identical thickness with compact surfaces. They thus can be used as effective oscillation dampers with higher surface pressure in the structural area to buffer propagation of auto body sounds.

An effective acoustic buffering of building parts can be procured with simultaneous mechanical carrying capacity and permanent impact resistance by application of such damping layers to wall structures.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A sound absorbing multi-layer structure for noise reduction, comprising: a structural sheet which is capable of oscillating, made of a material selected from the group consisting of sheet metal and plastic; and an oscillation-absorbing damping sheet, wherein:

the oscillation-absorbing sheet comprising at least one flexible heavy sheet and one viscoelastic support layer tightly connected therewith, which support layer incorporates a plurality of angularly constructed support elements, the oscillation-absorbing sheet with its support layer engages loosely on the structure which is capable of oscillating, and the individual support elements are shaped and arranged so that together with the structure which is capable of oscillating and the flexible heavy sheet they form a coherent labyrinth of transversely interconnected hollow spaces with acoustically active cavities.

2. Sound-absorbing multi-layer structure as defined in claim 1, wherein the structure which is capable of oscillating further includes a coating which provides protection and color for the structure.

3. Sound-absorbing multi-layer structure as defined in claim 1, wherein the support layer and the heavy sheet are made of the same material.

4. Sound-absorbing multi-layer structure as defined in claim 2, wherein the support layer and the heavy sheet are made of the same material.

5. Sound-absorbing multi-layer structure as defined in claim 3, wherein the oscillation-absorbing damping sheet is configured of one piece with the support layer formed integral with the damping sheet.

6. Sound-absorbing multi-layer structure as defined in claim 4, wherein the oscillation-absorbing damping sheet is configured of one piece with the support layer formed integral with the damping sheet.

7. Sound-absorbing multi-layer structure as defined in claim 5, wherein the sheet is a heavy sheet filled with multiple fillers selected from the group consisting of thermoplasts, elastomers and softener additives.

8. Sound-absorbing multi-layer structure as defined in claim 6, wherein the sheet is a heavy sheet filled with multiple fillers selected from the group consisting of thermoplasts, elastomers and softener additives.

9. Sound-absorbing multi-layer structure as defined in claim 1, wherein the multi-layer structure includes a plurality of sound-insulating layers lying on the flexible heavy sheet.

10. Sound-absorbing multi-layer structure as defined in claim 2, wherein the multi-layer structure includes a plurality of sound-insulating layers lying on the flexible heavy sheet.

11. Sound-absorbing multi-layer structure as defined in claim 3, wherein the multi-layer structure includes a plurality of sound-insulating layers lying on the flexible heavy sheet.

12. Sound-absorbing multi-layer structure as defined in claim 4, wherein the multi-layer structure includes a plurality of sound-insulating layers lying on the flexible heavy sheet.

13. Sound-absorbing multi-layer structure as defined in claim 5, wherein the multi-layer structure includes a plurality of sound-insulating layers lying on the flexible heavy sheet.

14. An oscillation absorbing damping sheet for a sound-absorbing multi-layer structure as defined in claim 1, wherein the damping sheet consists of a flexible heavy sheet and a viscoelastic support layer tightly connected therewith, which support layer incorporates a plurality of angularly structured support elements and the individual support elements are shaped and arranged so that together with a structure which is capable of oscillating and the flexible heavy sheet they can form a coherent labyrinth of transversely interconnected hollow space with acoustically effective cavities.

15. Oscillation-absorbing damping sheet as defined in claim 14, wherein the sheet is configured of one piece with the support layer formed in the sheet.

16. Oscillation-absorbing damping sheet as defined in claim 15, wherein the support elements are formed so that the acoustically active cavities have a base surface of 1 to 5 $cm^2$ and a height of 0.1 to 3.0 mm.

17. Oscillation-absorbing damping sheet as defined in claim 16, wherein the sheet is a heavy sheet filled with multiple fillers selected from the group consisting of thermoplasts, elastomers and softener additives.

18. Oscillation-absorbing damping sheet as defined in claim 1, wherein the sheet is a fiber-reinforced heavy sheet.

19. Sound absorbing multi-layer structure as defined in claim 3, wherein the oscillation-absorbing damping sheet is configured of one piece with the support layer impressed in the damping sheet.

20. Sound absorbing multi-layer structure as defined in claim 4, wherein the oscillation-absorbing damping sheet is configured of one piece with the support layer impressed in the damping sheet.

21. Oscillation-absorbing damping sheet as defined in claim 14, wherein the sheet is configured of one piece with the support layer impressed in the sheet.

* * * * *